United States Patent
Haiyan

(10) Patent No.: US 9,584,330 B2
(45) Date of Patent: Feb. 28, 2017

(54) METHOD FOR GENERATING A REAL TIME BILLING INFORMATION IN A PACKET SWITCHING BASED NETWORK AND NETWORK ELEMENT

(75) Inventor: Feng Haiyan, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 1284 days.

(21) Appl. No.: 12/733,914

(22) PCT Filed: Oct. 31, 2007

(86) PCT No.: PCT/CN2007/003099
§ 371 (c)(1),
(2), (4) Date: Mar. 26, 2010

(87) PCT Pub. No.: WO2009/055966
PCT Pub. Date: May 7, 2009

(65) Prior Publication Data
US 2010/0257079 A1    Oct. 7, 2010

(51) Int. Cl.
*G06Q 10/00*    (2012.01)
*G06Q 30/00*    (2012.01)
(Continued)

(52) U.S. Cl.
CPC ............. *H04L 12/14* (2013.01); *G06Q 30/04* (2013.01); *H04L 12/1403* (2013.01);
(Continued)

(58) Field of Classification Search
CPC ..... G06Q 30/04; H04L 12/14; H04L 12/1403; H04L 12/1453; H04M 15/00; H04M 15/56; H04M 15/59; H04M 2215/202
See application file for complete search history.

(56) References Cited

U.S. PATENT DOCUMENTS 6,023,499 A * 2/2000 Mansey et al. ............... 379/111
6,839,340 B1 * 1/2005 Voit et al. ...................... 370/352
(Continued)

OTHER PUBLICATIONS

3rd Generation Partnership Project (3GPP); 3rd Generation Partnership Project; Technical Specification Group Services and System Aspects Service Aspects; Charging and Biling (Release 8); 3GPP Standard; 3GPP TS 22.115, 3rd Generation Partnership Project (3GPP), Mobile Competence Centre; 650, Route Des Lucioles; F-06921 Sophia-Antipolis CEDEX; France; No. 8.1.0, Sep. 1, 2007; pp. 1-22; XP050360950.
(Continued)

*Primary Examiner* — Mussa A Shaawat
(74) *Attorney, Agent, or Firm* — Patti & Malvone Law Group, LLC

(57) ABSTRACT

The present invention proposes a method for generating a real time billing information in a packet switching based network and a network element for implementing Interworking between a circuit switching based network and a packet switching based network, wherein a call is set up between a user of said packet switching based network and a user of a circuit switching based network, and a billing server is informed of at least a billing rate and an interval of billing, said method for generating a real time billing information comprising: generating a first message with a first token indicating the billing rate upon receiving a first charge message containing said billing rate from said circuit switching based network and based on said first charge message, and the billing server is informed of said billing rate; once said call having been set up, generating a second messages with a second token indicating the interval of billing upon receiving a subsequent charge message containing said interval of billing and based on said subsequent charge message, and the billing server is informed of said interval
(Continued)

of billing; and generating a real time billing information by said billing server.

18 Claims, 7 Drawing Sheets

(51) Int. Cl.
    *G06Q 50/00*     (2012.01)
    *H04L 12/14*     (2006.01)
    *G06Q 30/04*     (2012.01)
    *H04M 15/00*     (2006.01)

(52) U.S. Cl.
    CPC ........ *H04L 12/1453* (2013.01); *H04M 15/00* (2013.01); *H04M 15/56* (2013.01); *H04M 15/59* (2013.01); *H04M 2215/202* (2013.01)

(56) References Cited

U.S. PATENT DOCUMENTS

| | | | |
|---|---|---|---|
| 6,977,999 B2* | 12/2005 | Honda et al. | 379/114.21 |
| 7,738,642 B2* | 6/2010 | Honda et al. | 379/114.21 |
| 2002/0025130 A1* | 2/2002 | Fink et al. | 385/127 |
| 2003/0031134 A1* | 2/2003 | Chiu | 370/252 |
| 2008/0103992 A1* | 5/2008 | Cai et al. | 705/402 |

OTHER PUBLICATIONS

Marshall, W. et al; Private Session Initiation Protocol (SIP) Proxy-to-Proxy Extensions; rfc3603.text, 20031001; Oct. 1, 2003; XP015009385; ISSN: 0000-0003; pp. 1-28.

* cited by examiner

US 9,584,330 B2

METHOD FOR GENERATING A REAL TIME BILLING INFORMATION IN A PACKET SWITCHING BASED NETWORK AND NETWORK ELEMENT

FIELD OF THE INVENTION

The present invention relates to the field of communication, and more particularly to the real time billing of a call in a packet switching based network.

BACKGROUND OF THE INVENTION

The IP Multimedia Subsystem (IMS) is the 3$^{rd}$ Generation Partnership Project's (3GPP) vision for a converged telecommunications architecture that merges cellular and Internet technologies to uniformly deliver voice, video, and data on a single network. Currently one of the hottest topics in telecom, IMS is rapidly becoming the architecture of choice for operators who wish to upgrade their existing cellular and fixed-line networks.

FIG. 1 shows a simplified view of the IMS architecture, which is divided into three parts: the service layer, the control layer and the access network. IMS applications are hosted in the service layer. This layer consists of SIP (Session Initiation Protocol) application servers (AS) which execute IMS applications and services by manipulating SIP signaling and interfacing with other systems. The control layer of the IMS network consists of nodes for managing call setup, management and release. At the heart of the control layer is a specialized SIP server called the Call Session Control Function (CSCF); all SIP signaling traverses this essential node. The CSCF inspects each SIP message and determines if the signaling should visit one or more application servers. Finally, the Media Gateway Control Function (MGCF) connects with circuit switch networks. The access network consists of IP routers and PSTN switches that provide access to the IMS network both from contemporary IP telephony devices and older circuit switch devices respectively.

In current IMS architecture, for an incoming PSTN (Public Switched Telephone Network) call, if a customer wants to get the IMS subscriber's billing information, it can only get therefrom CDR (Call Detailed Record) data by using CDR parsing tools. But the customer cannot obtain real-time billing records, which therefore needs additional CDR equipment for further analysis, especially during call talking.

FIG. 2 is a flow chart of a conventional call between an IMS network and a PSTN network, in which the billing server generates billing information based on the CDR sent by the AS at the end of the call, and the billing server cannot do the real time billing. The detailed signaling process is as follows:

when a SIP user wishes to begin a session with a PSTN user, the SIP node issues an INVITE request;
upon receipt of the INVITE request, the CSCF sends this request to the MGCF, and the MGCF maps it to an IAM (Initial Address Message) message and sends this IAM to the PSTN switch;
the PSTN switch indicates that the address is sufficient to set up a call by sending back an ACM (Address Complete Message) message;
the "called party status" code in the ACM message is mapped to a SIP provisional response 18x, which is returned to the SIP node;
when the PSTN user hangs off, the PSTN switch sends an ANM (Answer Message) message to the MGCF, and the MGCF maps it to an INVITE final response (200);
the INVITE final response is sent to the SIP node, and the SIP node sends back an ACK to acknowledge receipt;
the two users begin to talking;
when the PSTN user hangs up, the PSTN switch sends a REL message to the MGCF in order to cancel the call;
the MGCF maps the REL message to a BYE message;
the BYE is sent to the SIP node, and the SIP node sends back a 200 to confirm;
the MGCF maps the 200 to a RLC (Release Complete Message) message and sends this RLC to the PSTN switch;
the AS generates a CDR and sends it to the billing server.

A conceivable solution for getting the real time billing information is to encapsulate the ISUP (ISDN User Part) message in SIP MIME (Multipurpose Internet Mail Extensions) body. But in current IMS architecture, the application server cannot parse the SIP ISUP MIME body. Therefore, it is necessary to add different decode functions for different country variants. The AS must call different decode functions for the ISUP information in SIP MIME body with different country variants.

FIG. 3 shows the problem occurred in the above-described solution of real time billing. As shown in FIG. 3, the PSTN switch sends a charge message (CRG) indicating the billing rate of a call to the MGCF after receiving the IAM message, which CRG message is of the signaling No. 7 and includes billing information. Then, the MGCF encapsulates this CRG into the 18x message, which is a provisional response, and sends this 18x the AS. In order to obtain the billing rate, the AS must call different decode functions for the ISUP information in SIP MIME body with the different country variants. After the call having been set up, the PSTN switch sends another CRG message indicating the interval of billing of a call to the MGCF. The MGCF encapsulates this CRG message into an INFO message, which is a message carrying call related control information, and then sends the INFO message to the AS. As such, the AS must call different decode functions for the ISUP information in SIP MIME body with the different country variants for obtaining the interval of billing. In this way, the billing server could generate the real time billing information. It can be therefore seen that, the above solution is complex and costly.

For another approach, if a customer wants to get the almost real time billing information, the application server needs to transmit CDRs to the billing machine frequently, which will highly impact the application server performance.

SUMMARY OF THE INVENTION

To solve the above problem in the prior art, according to an aspect of the present invention, a method for generating a real time billing information in a packet switching based network is proposed, wherein a call is set up between a user of said packet switching based network and a user of a circuit switching based network, and a billing server is informed of at least a billing rate and an interval of billing, the method comprises: generating a first message with a first token indicating the billing rate upon receiving a first charge message containing said billing rate from said circuit switching based network and based on said first charge message, and the billing server is informed of said billing rate; once said call having been set up, generating a second message with a second token indicating the interval of billing upon receiving a subsequent charge message containing said interval of billing and based on said subsequent charge message, and the billing server is informed of said interval of billing; and generating a real time billing information by said billing server.

According another aspect of the present invention, a network element for implementing Interworking between a circuit switching based network and a packet switching based network is proposed, wherein a call is set up between a user of said packet switching based network and a user of said circuit switching based network, and a billing server is informed of at least a billing rate and an interval of billing, said network element comprises: a first token adding means for generating a first message with a first token indicating the billing rate upon receiving a first charge message containing said billing rate from said circuit switching based network and based on said first charge message; and a second token adding means for, once said call having been set up, generating a second message with a second token indicating the interval of billing upon receiving a subsequent charge message containing said interval of billing and based on said subsequent charge message.

BRIEF DESCRIPTION OF THE DRAWINGS

These and many other features and advantages of the present invention will become apparent from the following description of the embodiments of the present invention with reference to the drawings, wherein.

DETAILED DESCRIPTION OF THE INVENTION

The present invention proposes a method for generating a real time billing information in a packet switching based network. This method may be for example applied to the IMS network shown in FIG. 6.

Figure 1:
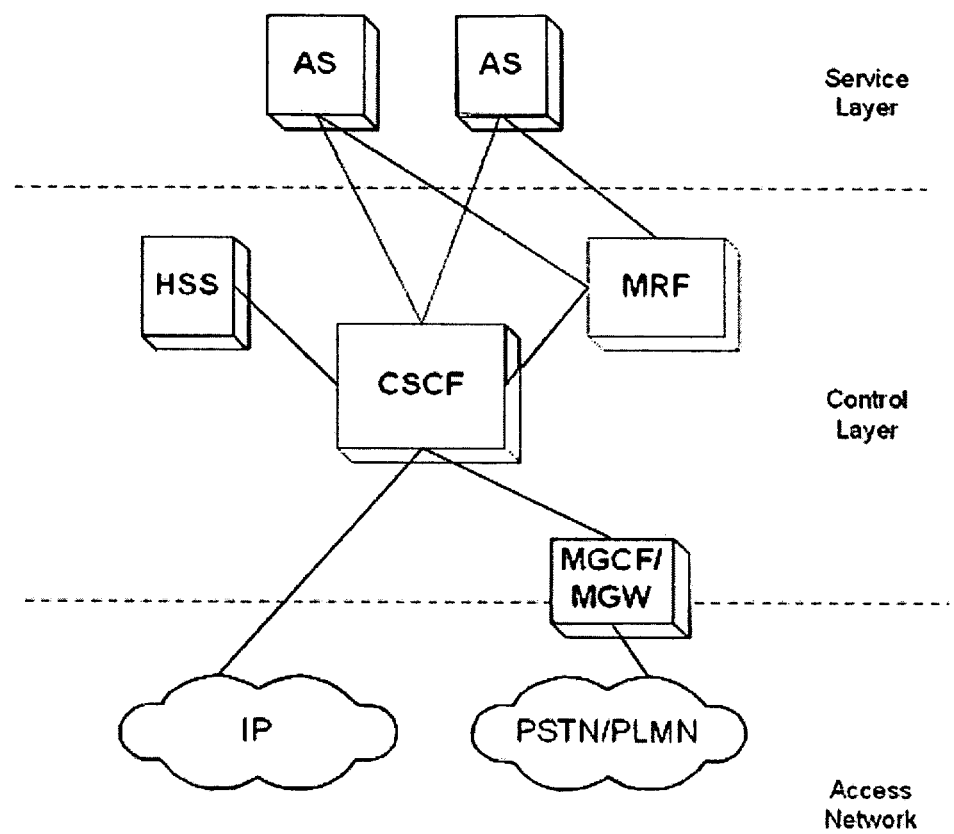
FIG. 1 shows a simplified view of the IMS architecture.
Figure 2:
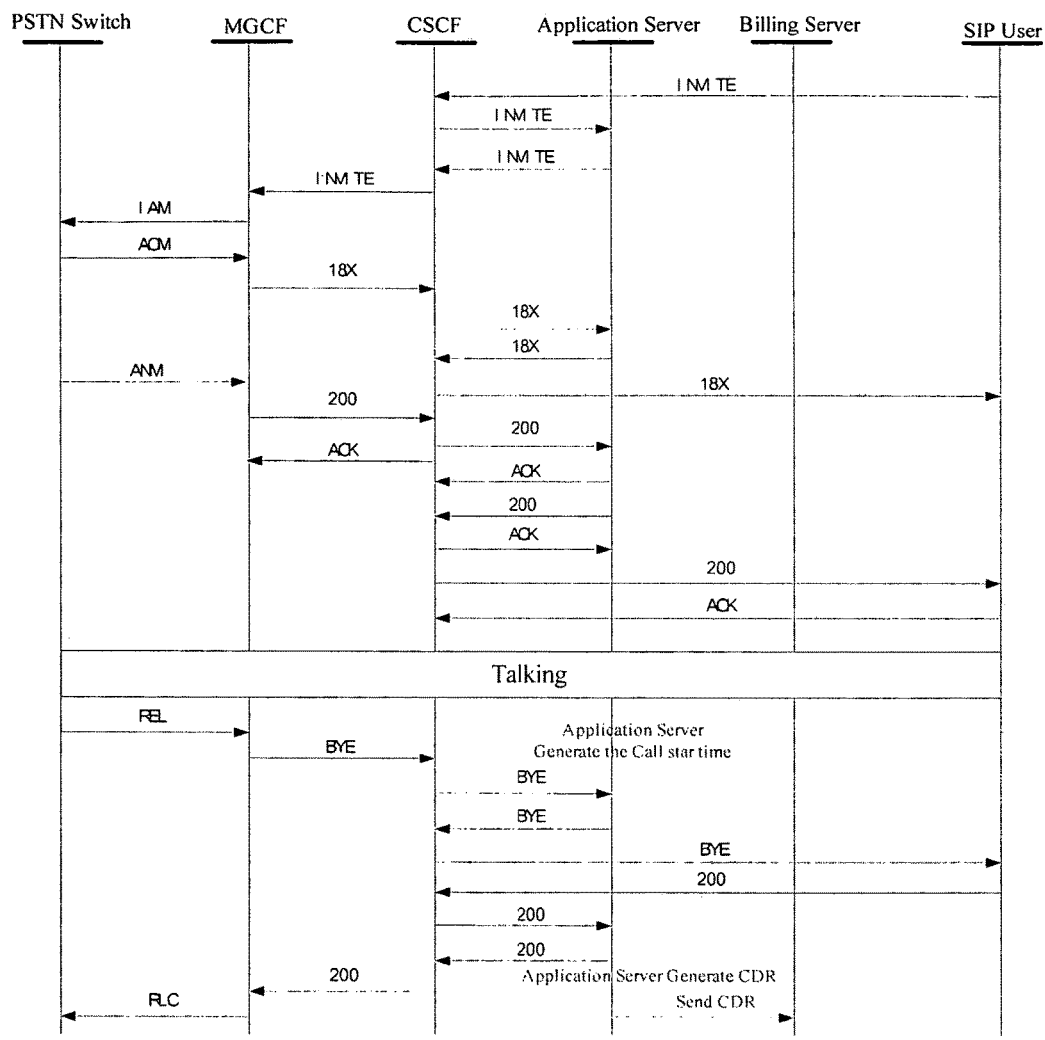
FIG. 2 is a flow chart of a conventional call between an IMS network and a PSTN network.
Figure 3:
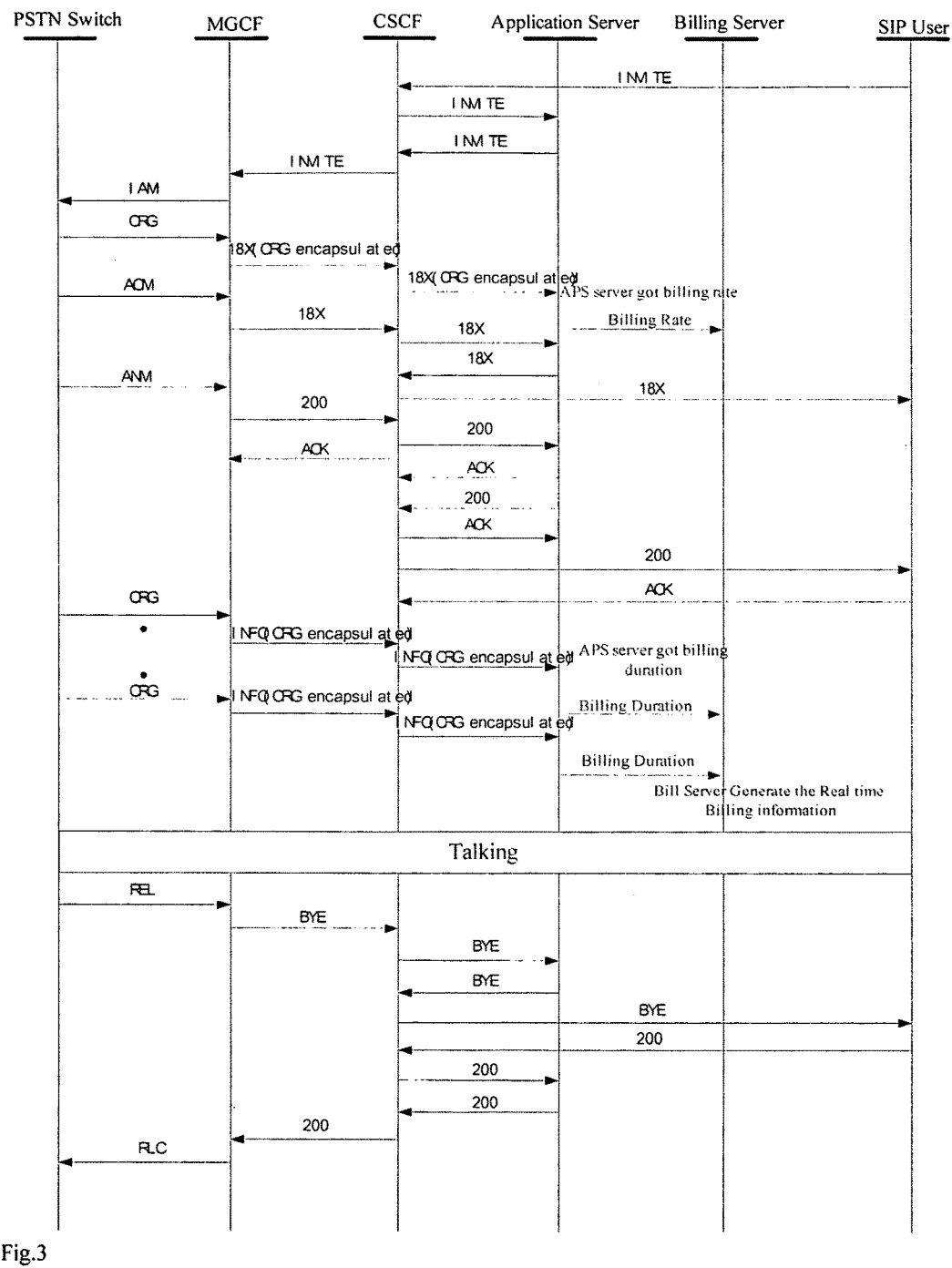
FIG. 3 shows the problem occurred in the prior art solution of real time billing.
Figure 4:
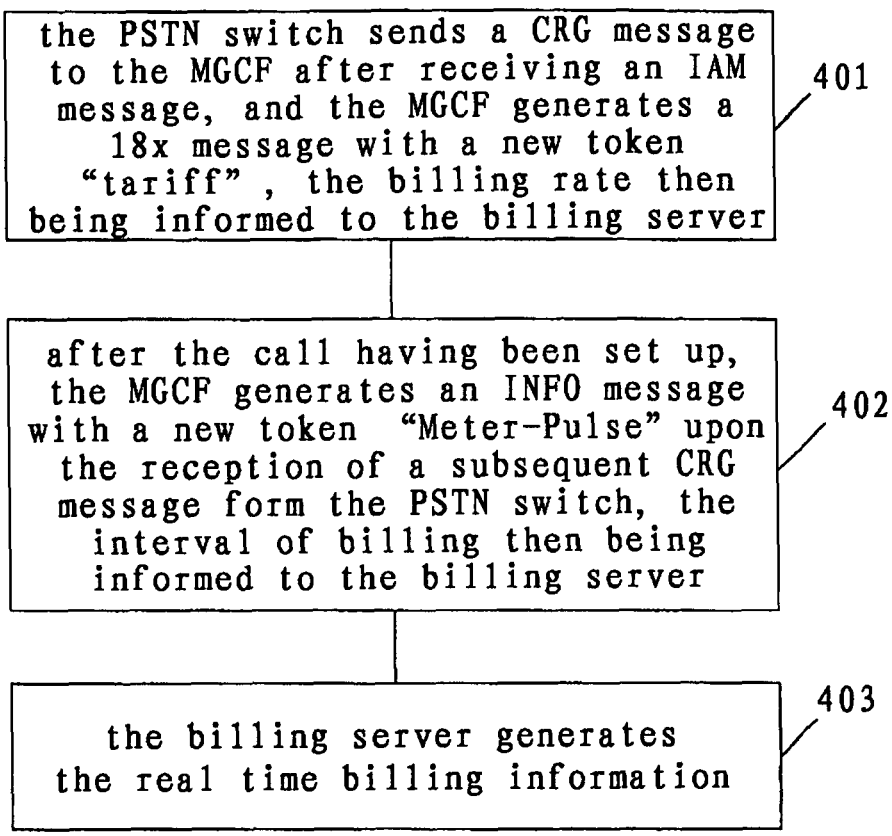
FIG. 4 is a flow chart of the method for generating a real time billing information by expanding SIP protocol in an IMS network according to an embodiment of the present invention.
Figure 5:
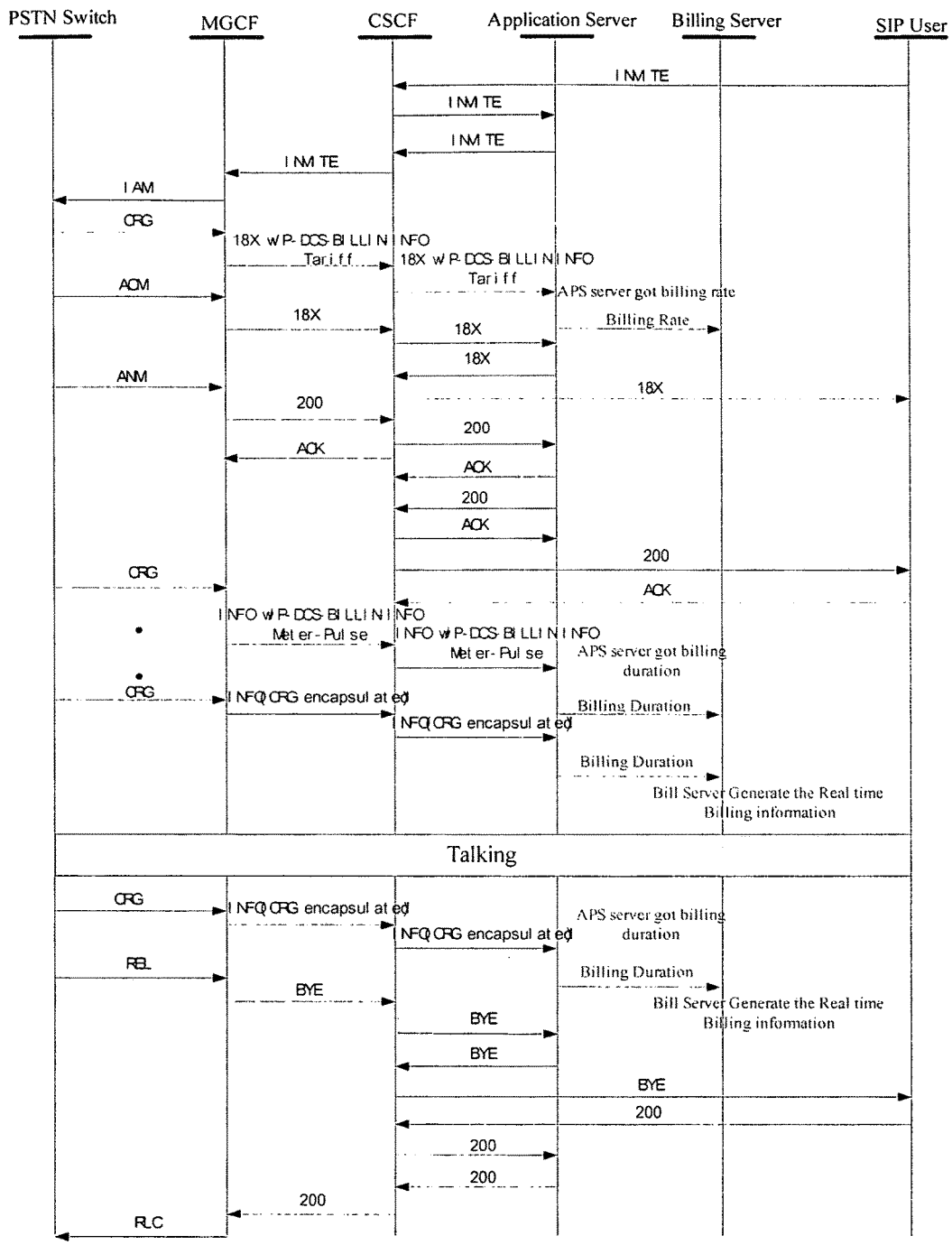
FIG. 5 shows a call process between an IMS network and a PSTN network, in which the real time billing information could be generated according to the embodiment of the method of the present invention.
Figure 6:
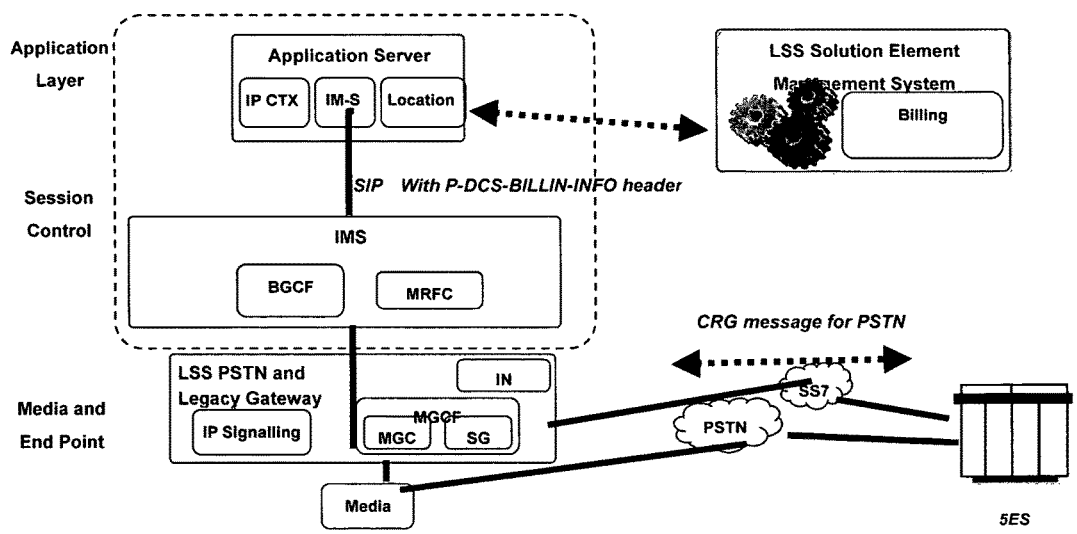
FIG. 6 shows the implementation of the method of the present invention in the IMS architecture.

With reference to FIG. 4, the method for generating a real time billing information is described in combination with the IMS architecture shown in FIG. 6 and the signaling process shown in FIG. 5.

As shown in FIG. 4, firstly, in step 401, a first message with a first token indicating the billing rate is generated upon receiving a first charge message from said circuit switching based network and based on said first charge message, and the billing server is informed said billing rate.

In current IMS architecture, the P-DCS-BILLING-INFO header has already been supported by IMS SIP. This header is used to carry the billing information in 3GPP standard. In this embodiment, the PSTN switch sends a charge message (CRG) to the MGCF after receiving an IAM message. The MGCF then adds a new token "Tariff" into the P-DCS-BILLING-INFO header of the 18x message based on the CRG message in step 401 and transmits this 18x message to the CSCF, which in turn transmits it to the AS. The token "Tariff" refers to the billing rate of a call. Therefore, the AS could get the billing rate from this message and the billing server is informed of that billing rate.

Next, in step 402, once said call having been set up, a second message with a second token indicating the interval of billing are generated upon receiving a subsequent charge message and based on said subsequent charge message, and the billing server is informed of said interval of billing. The billing server is configured to generate the real time billing information continuously based on the billing rate and the interval of billing.

In this embodiment, after receiving the ACK message from the CSCF, the MGCF adds a new token "Meter-Pulse" into the P-DCS-BILLING-INFO header of the INFO message upon the reception of a subsequent CRG message form the PSTN switch and based on this CRG message in step 402. The token "Meter-Pulse" refers to the interval of billing of a call. The MGCF then sends the INFO message with the new token "Meter-Pulse" to the CSCF, which in turn sends them to the AS. The AS thus could get the interval of billing from the INFO message and the billing server is informed of that interval of billing. In case the interval of billing should be changed, for example on demand of the subscribers, the PSTN switch will send another CRG message indicating a new interval of billing to the MGCF. The MGCF then generates a new INFO message, the token "Meter-Pulse" in the header of that INFO message indicating a new interval of billing, which new INFO message is then sent to the CSCF. In this way, the billing server could get the new interval of billing and recalculate the charge of call.

Finally, in step 403, the real time billing information is generated by the billing server, on the basis of the billing rate and the interval of billing.

It should be noted that, according to the present method, the interval of billing could be set according to a demand of the subscribers.

The new coding of the P-DCS-BILLING-INFO header is as follows. The newly added tokens are boldfaced.
P-DCS-Billing-Info="P-DCS-Billing-Info" HCOLON
   Billing-Correlation-ID "/" FEID
   *(SEMI Billing-Info-param)
Billing-Correlation-ID=1*48(HEXDIG)
FEID=1*16(HEXDIG)"@" host
Billing-Info-param=RKS-Group-ID-param/Charge-param/
   Calling-param/Called-param/
   Routing-param/Loc-Routing-param/
   generic-param/Tariff/Meter-Pulse
RKS-Group-ID-param="rksgroup" EQUAL RKS-Group-
   ID
RKS-Group-ID=token
Charge-param="charge" EQUAL Acct-Charge-URI
Acct-Charge-URI=LDQUOT addr-spec RDQUOT
Calling-param="calling" EQUAL Acct-Calling-URI
Acct-Calling-URI=LDQUOT addr-spec RDQUOT
Called-param="called" EQUAL Acct-Called-URI
Acct-Called-URI=LDQUOT addr-spec RDQUOT
Routing-param="routing" EQUAL Acct-Routing-URI
Acct-Routing-URI=LDQUOT addr-spec RDQUOT
Loc-Routing-param="locroute" EQUAL Acct-Loc-Routing-URI
Acct-Loc-Routing-URI=LDQUOT addr-spec RDQUOT
Tariff="Tariff" EQUAL tariff

Tariff=1*DIGIT
Meter-Pulse="Meter-Pulse" EQUAL Meter-Pulse
Meter-Pulse=1*DIGIT

Thereby, with this method, by expanding the support message for the P-DCS-BILLING-INFO header, the AS needs only to support parsing the Tariff and the Meter-Pulse information from the P-DCS-BILLING-INFO header and support carrying this header in 18x and INFO messages, both of which could be transmitted during a call. It should be noted that, the P-DCS-BILLING-INFO header could originally only present in the INVITE message in the standard.

Furthermore, For the MGCF and the AS, they just follow the 3GPP standard to handle the P-DCS-BILLIN-INFO header in the IMS SIP message. The customer can enjoy the real time billing service without change in the IMS architecture. Meanwhile, multiple country variants could be supported without changing the MGCF and the AS functions.

The method of the present invention has also the following advantages:
  the performance of the MGCF and the AS is highly improved;
  it is not necessary to call different decode functions for different country variants during the different country variants real time billing;
  the 3GPP standard header P-DCS-BILLIN-INFO is reused to carry PSTN billing information, which can be easily accepted in the IMS architecture;
  the customers need not to buy additional equipment to do the CDR analysis and can implement the real time billing work.

Based on the same inventive concept, according to another aspect of the present invention, a network element is proposed for implementing the Interworking between a circuit switching based network and a packet switching based network. The network element will be described in the following with reference to FIG. 7.

Figure 7:
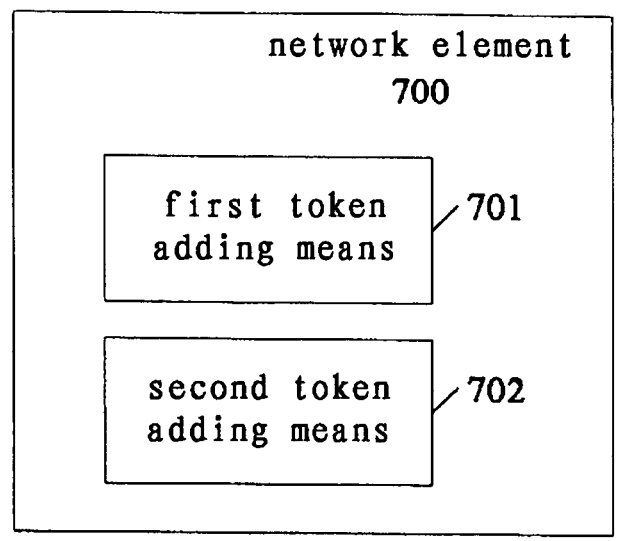
FIG. 7 is a block diagram of the network element according to an embodiment of the present invention.

FIG. 7 is a block diagram of the network element according to an embodiment of the present invention, which for example is a MGCF in an IMS network. The network element 700 includes a first token adding means 701 and a second token adding means 702. Again, with reference to FIGS. 5 and 6, in this embodiment, when the PSTN switch sends a CRG message to the MGCF after receiving an IAM message, the first token adding means 701 generates a 18x message with a new token "Tariff" in its P-DCS-BILLING-INFO header based on the CRG message, and then the MGCF transmits this 18x message to the CSCF, which in turn transmits it to the AS. Therefore, the AS could get the billing rate from this message and the billing server is informed of that billing rate. After receiving the ACK message from the CSCF, the second token adding means 702 generates an INFO message with a new token "Meter-Pulse" in its P-DCS-BILLING-INFO header upon the reception of a subsequent CRG message form the PSTN switch and based on this CRG message. The MGCF sends the INFO messages with the new token "Meter-Pulse" to the CSCF, which in turn sends them to the AS. The AS thus could get the interval of billing from the INFO messages and the billing server is informed of that interval of billing. In case the interval of billing should be changed, for example on a demand of the subscribers, the PSTN switch will send another CRG message indicating a new interval of billing to the MGCF. The second token adding means 702 then adds the token "Meter-Pulse" indicating another interval of billing into a new INFO message, which new INFO message is then sent to the CSCF. In this way, the billing server could get the new interval of billing and recalculate the charge of call.

In implementation, the network element 700 of this embodiment as well as the first token adding means 701 and the second token adding means 702 it includes, may be implemented in software, hardware or a combination of them. For example, those skilled in the art are familiar with a variety of devices which may be used to implement these components, such as micro-processor, micro-controller, ASIC, PLD and/or FPGA etc. The first token adding means 701 and the second token adding means 702 of the present embodiment may be either implemented as integrated into the network element 700, or implemented separately, and they may also be implemented separately physically but interconnected operatively.

In operation, said network element for implementing the Interworking between a circuit switching based network and a packet switching based network of the embodiment illustrated in connection with FIG. 7, may just follow the 3GPP standard to handle the P-DCS-BILLIN-INFO header in the IMS SIP message by expanding the support message for the P-DCS-BILLING-INFO header. As a result, the AS needs only to support parsing the Tariff and the Meter-Pulse information from the P-DCS-BILLING-INFO header and support carrying this header in 18x and INFO messages, both of which could be transmitted during a call. It should be noted that, the P-DCS-BILLING-INFO header could originally only present in the INVITE message in the standard. By this means, the customers can enjoy the real time billing service without change in the IMS architecture and need not to buy additional equipment to do the CDR analysis; multiple country variants could be supported without changing the MGCF and the AS functions; the performance of the MGCF and the AS is highly improved; and the 3GPP standard header P-DCS-BILLIN-INFO is reused to carry PSTN billing information, which can be easily accepted in the IMS architecture.

Although the exemplary embodiments of the method for generating a real time billing information in a packet switching based network and the network element for implementing the Interworking between a circuit switching based network and a packet switching based network of the present invention are described above in detail, the above embodiments are not exhaustive, and those skilled in the art can make numerous changes and modifications within the spirit and scope of the present invention. Therefore, the present invention is not limited to those embodiments, the scope of which is defined only by the appended claims.

The invention claimed is:

1. A method for generating a real time billing information in a packet switching based network, wherein a call is set up between a user of said packet switching based network and a user of a circuit switching based network, and wherein a billing server is informed of at least a billing rate and an interval of billing, the method comprising the steps of:
  generating, via a network element, a first message with a first token that indicates the billing rate upon receipt of a first charge message that contains said billing rate from said circuit switching based network and based on said first charge message, wherein the billing server is informed of said billing rate;
  once said call has been set up, generating, via the network element, a second message with a second token that indicates the interval of billing upon receipt of a subsequent charge message that contains said interval of billing and based on said subsequent charge message, wherein the billing server is informed of said interval of billing; and generating continuously, via said billing server, the real time billing information after receipt of the billing rate and the interval of billing.

2. The method according to claim 1, wherein said circuit switching based network is a public switched telephone network and said packet circuit switching based network is an IP Multimedia Subsystem (IMS) network.

3. The method according to claim 1, further comprising the step of receiving said first charge message from a switch in said circuit switching based network upon receipt of a call initiation message from said packet switching based network.

4. The method according to claim 1, wherein said interval of billing is set according to a demand of a subscriber.

5. The method according to claim 1, wherein said first message is a provisional response 18x that conforms to a session initiation protocol.

6. The method according to claim 1, wherein said second message is a message that carries call related control information that conforms to a session initiation protocol.

7. The method according to claim 1, wherein said first token and said second token are respectively added into headers of the first message and the second message.

8. The method according to claim 7, wherein said headers are P-DCS-BILLING-INFO headers.

9. The method according to claim 1, further comprising the steps of:

generating a new second message with a new second token that indicates a new interval of billing upon receipt of a new charge message that contains the new interval of billing when the interval of billing is changed; and informing the billing server of said new interval of billing based on said new charge message.

10. A network element configured to implement Interworking between a circuit switching based network and a packet switching based network, wherein a call is set up between a user of said packet switching based network and a user of said circuit switching based network, and wherein a billing server is informed of at least a billing rate and an interval of billing to generate real time billing information, comprising:

a first token adding means for generating a first message with a first token that indicates the billing rate upon receipt of a first charge message that contains said billing rate from said circuit switching based network and based on said first charge message; and a second token adding means for generating a second message with a second token that indicates, once said call has been set up, the interval of billing upon receipt of a subsequent charge message that contains said interval of billing and based on said subsequent charge message;

wherein the real time billing information is generated continuously by said billing server after receipt of said billing rate and said interval of billing.

11. The network element according to claim 10, wherein said circuit switching based network is a public switched telephone network and said packet circuit switching based network is an IP Multimedia Subsystem (IMS) network.

12. The network element according to claim 10, wherein the network element is configured to receive said first charge message from a switch in said circuit switching based network upon receipt of a call initiation message from said packet switching based network.

13. The network element according to claim 10, wherein said interval of billing is set according to a demand of a subscriber.

14. The network element according to claim 10, wherein said first message is a provisional response 18x that conforms to a session initiation protocol.

15. The network element according to claim 10, wherein said second message is a message that carries call related control information that conforms to a session initiation protocol.

16. The network element according to claim 10, wherein said first token and said second token are respectively added into the headers of the first message and the second message.

17. The network element according to claim 16, wherein said headers are P-DCS-BILLING-INFO headers.

18. The network element according to claim 10, wherein when the interval of billing is changed, said second token adding means is configured to generate a new second message with a new second token that indicates a new interval of billing upon receipt of a new charge message that contains the new interval of billing based on said new charge message.

* * * * *